Aug. 4, 1931.　　　　J. LIGINSKI　　　　1,817,415
ANIMAL RELEASING AND FRIGHTENING MEANS
Filed Oct. 18, 1928　　　3 Sheets-Sheet 2
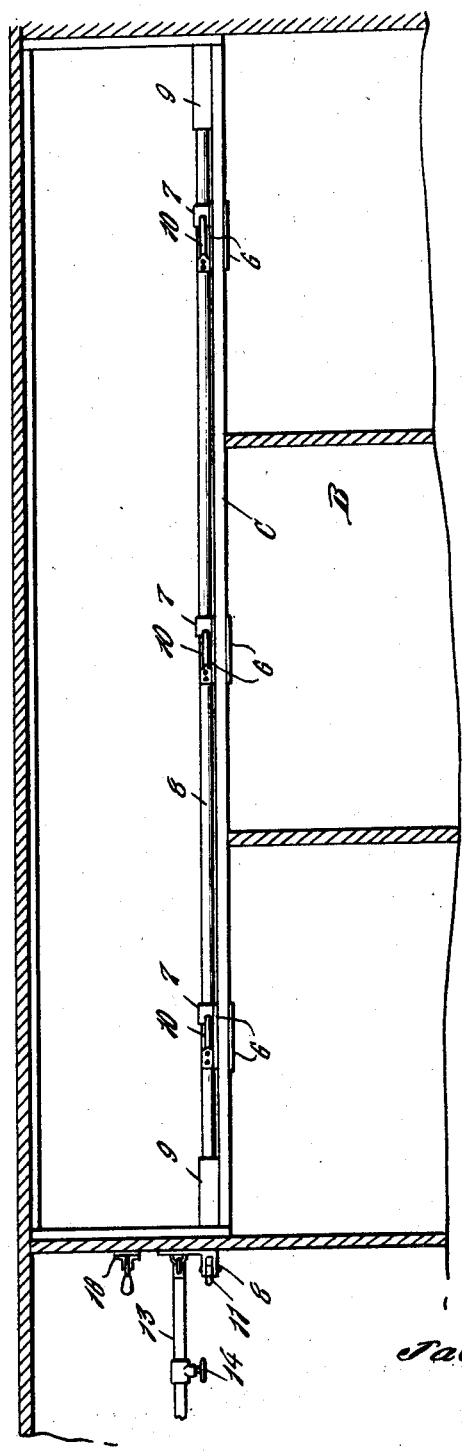
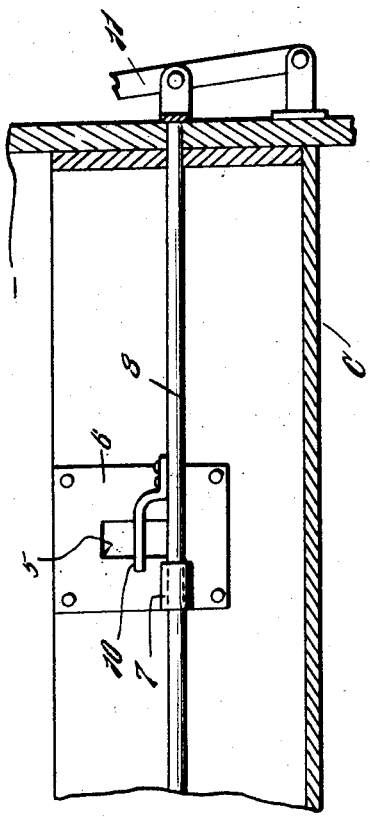
Inventor
Jacob Liginski
By Clarence A. O'Brien
Attorney Aug. 4, 1931.  J. LIGINSKI  1,817,415
ANIMAL RELEASING AND FRIGHTENING MEANS
Filed Oct. 19, 1928   3 Sheets-Sheet 3
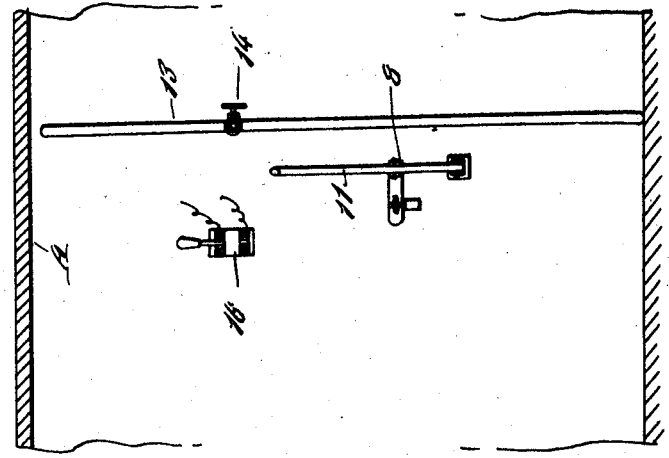
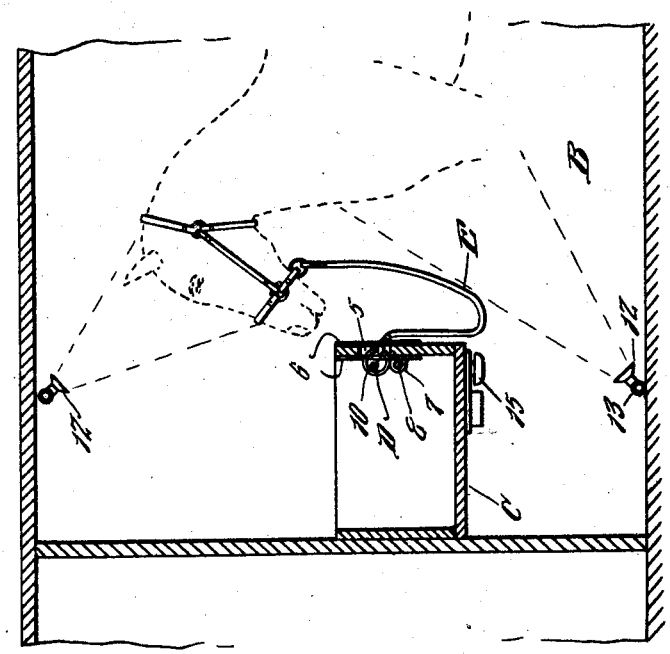
Inventor
Jacob Liginski
By Clarence A. O'Brien
Attorney Patented Aug. 4, 1931

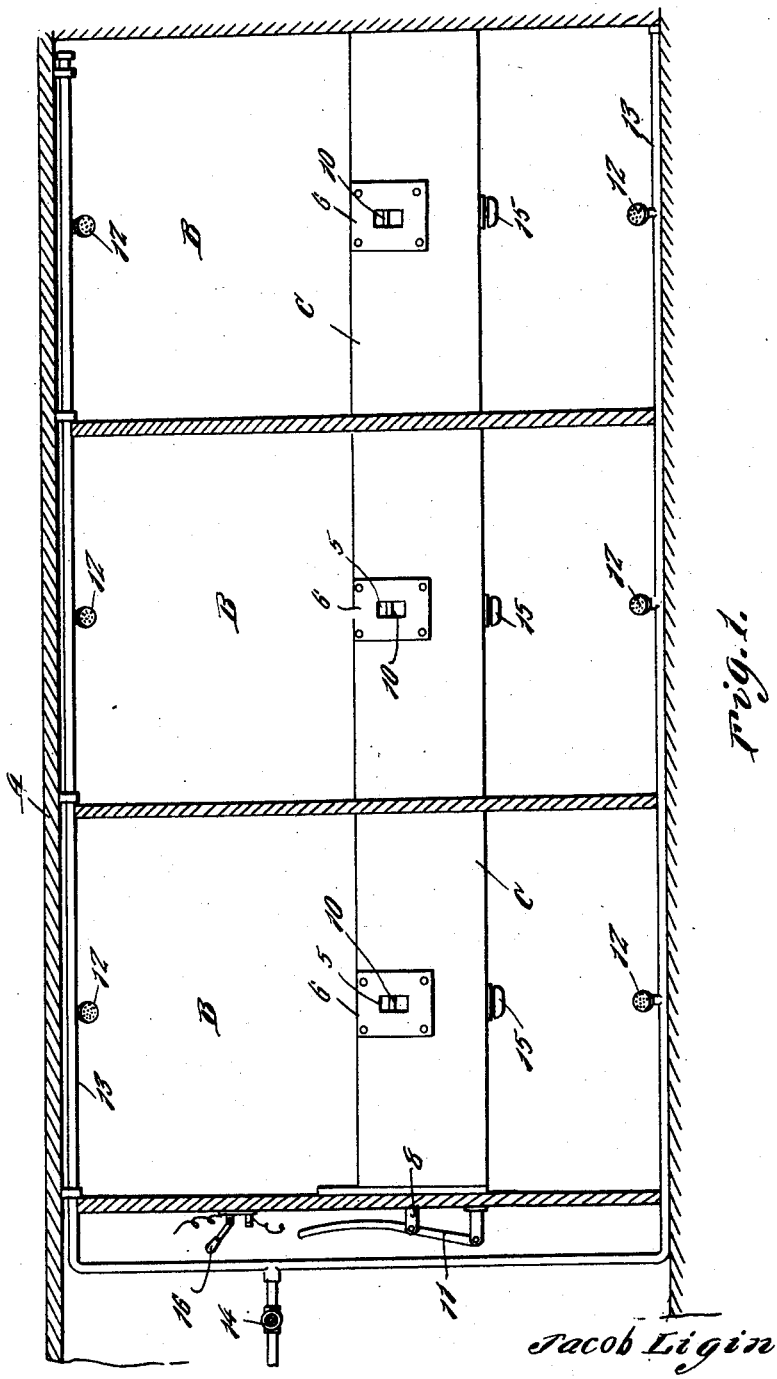

1,817,415

UNITED STATES PATENT OFFICE

JACOB LIGINSKI, OF WHIPPANY, NEW JERSEY

ANIMAL RELEASING AND FRIGHTENING MEANS

Application filed October 18, 1928. Serial No. 313,270.

This invention relates to new and useful improvements in animal releasing devices together with means for frightening the animals so that after releasing from their stalls they will back therefrom so as to be led from the building in the event of a fire. It is well known that when an animal such as a horse is within a stall of a burning building it is practically impossible to urge the horse to leave the stall. Moreover, it is highly dangerous for any one to attempt to enter the stall when occupied in the event of a fire in the building due to the fact that the horse will stamp upon the floor, and move jerkily from side to side. It is for this reason that usually the animals within a burning building are destroyed.

Generally the invention consists of single mechanism for trying the animals within their stalls, said mechanism being releasable from a point at one end of the building, other means being provided to direct the spray of water under pressure upon the head and chest of the animal after he has been released so that he will back from the stall and enable the attendants to lead the animal from the burning building.

An important object of the invention is to provide a means of this character that is relatively simple in construction and inexpensive of installation and upkeep.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:

Figure 1 is a fragmentary vertical longitudinal section through the animal stalls of a building equipped with my improved structure.

Figure 2 is a fragmentary longitudinal transverse section.

Figure 3 is a fragmentary vertical transverse section through one of the stalls of my improved mechanism.

Figure 4 is a fragmentary vertical section through the building at the end of the stalls and looking toward the adjacent wall of the endmost stall, which wall is equipped with means for releasing the animal and operating the devices to so frighten the animal from the stall, and Figure 5 is a detail fragmentary longitudinal section through the releasing mechanism directly in back of the front walls of the stall feed boxes.

Now having particular reference to the drawings, A designates generally a barn or similar building provided with a plurality of spaced animal stalls B. Within the rear of each stall is a suitable feed box C through the front wall of each of which is an opening 5 the material around these openings being provided at opposite sides of the said front wall by guard plates 6—6 which have openings registering with the openings 5. The rearmost guard plate 6 within each stall at one side of its opening and at the lower end thereof is equipped with a longitudinal shaft bearing 7, while arranged longitudinally in back of the front walls of these feed boxes is a longitudinally extending shaft 8, journaled within the plate bearings 7 intermediate their ends and at their opposite ends in suitable bearings 9—9. Said shaft 8 is equipped at a point within each stall B, and adjacent the stall wall openings 5 with a spaced longitudinally extended pin 10 for engagement through the usual ring D of the animal halter strap or rope E when said ring is arranged through the opening in the front feed box wall as clearly illustrated in Figure 3. One end of the shaft 8 projects through the outer wall of one of the end most stalls B and to this end is attached a lever 11 pivoted to the wall as illustrated in Figure 1. Obviously a pull upon this lever will so actuate the shaft 8 as to release all the pins 10 from the halter rings D, thus permitting the animal to move backward within the stall.

Arranged within each stall above and below the feed box C are water nozzles 12—12 arranged so as to direct a spray of water upon the head and chest of the animal within the stall as illustrated in Figures 3. These nozzles 12—12 have communication with water pipes 13 arranged within the building, while the flow of the water through the pipes is governed by a valve 14 located in the building adjacent the lever 11.

Also arranged within each stall preferably upon the under side of the feed box C is an electric buzzer, bell, or sounding device 15 having circuit with a source of electrical energy through the medium of a suitable switch 16, also located adjacent the lever 11 and valve 14. Obviously when the animals are released, the closing of the circuit will sound the alarm, while the opening of the valve 14 will result in the spraying of water upon the head and chest of the animal, frightening him from the stall.

Having thus described the invention, what I claim as new and desire to secure by Letters Patent is:—

In combination, an animal releasing and frightening means for arrangement within a barn having a plurality of animal stalls within each of which stall is a feed box, the outer wall of each feed box having a halter ring receiving opening, a pair of complementary plates disposed on the opposite sides of said outer wall having openings therein registering with said wall openings, a longitudinal shaft bearing on the inner plate of each pair, a rigid shaft mounted for sliding movement in the bearing in each of the plates adjacent the openings therein, pins carried by said shaft adjacent each opening and having straight free end portions disposed in spaced parallelism with the shaft for engagement through the halter rings when the shaft is moved in one direction to lock the rings within the registering openings, a single throw lever mounted on the outer wall of one of the end stalls and having connection with said shaft for locking and unlocking the halter rings.

In testimony whereof I affix my signature.

JACOB LIGINSKI.